(12) United States Patent
Orlik et al.

(10) Patent No.: US 9,118,600 B2
(45) Date of Patent: Aug. 25, 2015

(54) LOCATION BASED DATA DELIVERY SCHEDULERS

(71) Applicant: Mitsubishi Electric Research Laboratories, Inc., Cambridge, MA (US)

(72) Inventors: Philip Orlik, Cambridge, MA (US); Ke Xu, Clemson, SC (US); Jianlin Guo, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 381 days.

(21) Appl. No.: 13/759,703

(22) Filed: Feb. 5, 2013

(65) Prior Publication Data

US 2013/0262648 A1 Oct. 3, 2013

Related U.S. Application Data

(63) Continuation-in-part of application No. 13/436,047, filed on Mar. 30, 2012.

(51) Int. Cl.
*H04L 12/28* (2006.01)
*H04L 12/24* (2006.01)
*H04L 12/823* (2013.01)
*H04L 12/801* (2013.01)
*H04L 12/851* (2013.01)
*H04W 4/02* (2009.01)

(52) U.S. Cl.
CPC ............... *H04L 41/50* (2013.01); *H04L 47/12* (2013.01); *H04L 47/32* (2013.01); *H04L 47/14* (2013.01); *H04L 47/24* (2013.01); *H04W 4/021* (2013.01)

(58) Field of Classification Search
CPC ...................................................... H04L 47/24
See application file for complete search history.

(56) References Cited

U.S. PATENT DOCUMENTS

| | | | |
|---|---|---|---|
| 6,781,971 B1 | 8/2004 | Davis et al. | |
| 2003/0126244 A1* | 7/2003 | Smith et al. | 709/223 |
| 2004/0180677 A1* | 9/2004 | Harris et al. | 455/466 |
| 2011/0267951 A1* | 11/2011 | Stanwood et al. | 370/235 |
| 2013/0262648 A1 | 10/2013 | Orlik et al. | |

FOREIGN PATENT DOCUMENTS

GB 2481715 * 7/2011 ............. H04L 29/06

OTHER PUBLICATIONS

Ke Xu et al. "Location Based Data Delivery Schedulers for Vehicle Telematics Applications," Vehicular Technology Conference (VTC Fall) 2012 IEEE, Sep. 3, 2012. p. 1-5.

Yang Zhang et al. "Service Scheduling of Vehicle-Roadside Data Access," Mobile Networks and Applications, Kluwer Academic Publishers, BO, vol. 15, No. 1, May 16, 2009. p. 83-96.

* cited by examiner

*Primary Examiner* — Man Phan
*Assistant Examiner* — Nourali Mansoury
(74) *Attorney, Agent, or Firm* — Dirk Brinkman; Gene Vinokur

(57) ABSTRACT

Packets are transmitted by a server to mobile nodes in a coverage area of a wireless network using a coverage and reliability map, which indicates qualities and reliabilities of links between the server and the nodes. When a new packet is received in the server, the server transmits the packet if a current load of the packets including the new packet is less than a peak load constraint. Otherwise, the new packet is delayed for one time slot. Packets are transmitted according to associated priorities.

4 Claims, 8 Drawing Sheets

LOCATION BASED DATA DELIVERY SCHEDULERS

RELATED APPLICATION

This is a continuation-in-part application of U.S. patent application Ser. No. 13/436,047, "Location Based Data Delivery Schedulers," filed by Orlik et al., on Mar. 30, 2012.

FIELD OF THE INVENTION

This invention relates generally to wireless communications, and more particularly to mobile communications and application layer scheduling to communicate packets by mobile devices.

BACKGROUND OF THE INVENTION

Automotive and communication industries provide broadband Internet connectivity to mobile devices (nodes) in vehicles. Applications include road safety, driver assistance, information, entertainment, and vehicle telematics. Telematics is any integrated use of telecommunications and informatics, also known as ICT (Information and Communications Technology).

These applications use a range of wireless communication methods based on Wi-Fi, dedicated short range radios (DSRC), or 3G/4G radios, such as Mobile WiMAX, and long term evolution (LTE). Infrastructure-based vehicular networks refer to vehicle-to-infrastructure (V2I) networks and vehicle-to-roadside (V2R) networks.

The networks use statically deployed access points (APs) or base stations (BSs) to communicate with the nodes. Despite a higher cost to deploy and maintain the AP/BS infrastructure, mobile applications are interested in infrastructure-based networks because of a higher reliability and constant availability where such infrastructure exists.

Scheduling methods for data delivery in mobile wireless networks are known. One method uses link-layer scheduling for non-real-time, non-safety data transmission in V2I systems proposed for the IEEE 802.11e standard. That method attempts to deliver as much information as possible considering a limited radio coverage of road segment, and relatively high vehicle speeds.

Another method describes scheduling for the downlink of a cellular network, including joint Knopp and Humblet (K&H) round robin (RR) scheduler and resource constrained (RC) scheduling, to achieve capacity gain and minimize channel usage under quality of service (QoS) constraints.

Another method describes physical-layer scheduling and resource allocation mechanism for the downlink in a code division multiple access (CDMA) systems, maximizing a weighted sum throughput.

Another method describes a scheduling mechanism for a downlink of a cellular orthogonal frequency-division multiplexing (OFDM) system, with considerations including integer carrier allocations, different sub-channelization methods, and self-noises due to imperfect channel estimates or phase noise.

Most of the prior art scheduling methods do not considered the characteristics of applications in vehicular networks, and also depend on a specific low-layer technologies of radio access network (RAN). Only a few prior art methods describe scheduling for the applications in vehicular networks.

One method describes application-layer service scheduling of vehicle-roadside data access, considering service deadline, data size, and broadcasting.

SUMMARY OF THE INVENTION

The embodiments of the invention provide a method for scheduling telematics services in vehicular networks. Specifically, the schedulers are implemented in a server for navigation a system, such as an iPhone, Google Navi, and an Android Navi, to achieve an efficient data delivery for nodes, independent of a specific RAN.

The schedulers minimize resources (bandwidth) on wireless channels, resulting in reducing a cost for application providers, while satisfying the requirements for users of mobile devices.

The previous application, Ser. No. 13/436,047 describes a method where packets are transmitted by a server to mobile nodes in a coverage area of a wireless network using a coverage and reliability map. The map indicates qualities and reliabilities of links between the server and the nodes. When a new packet is received in the server, the server transmits the packet if a current load of the packets including the new packet is less than a peak load constraint. Otherwise, the new packet is delayed for one time slot.

DETAILED DESCRIPTION OF THE PREFERRED EMBODIMENT

Telematic Server

Figure 1A:
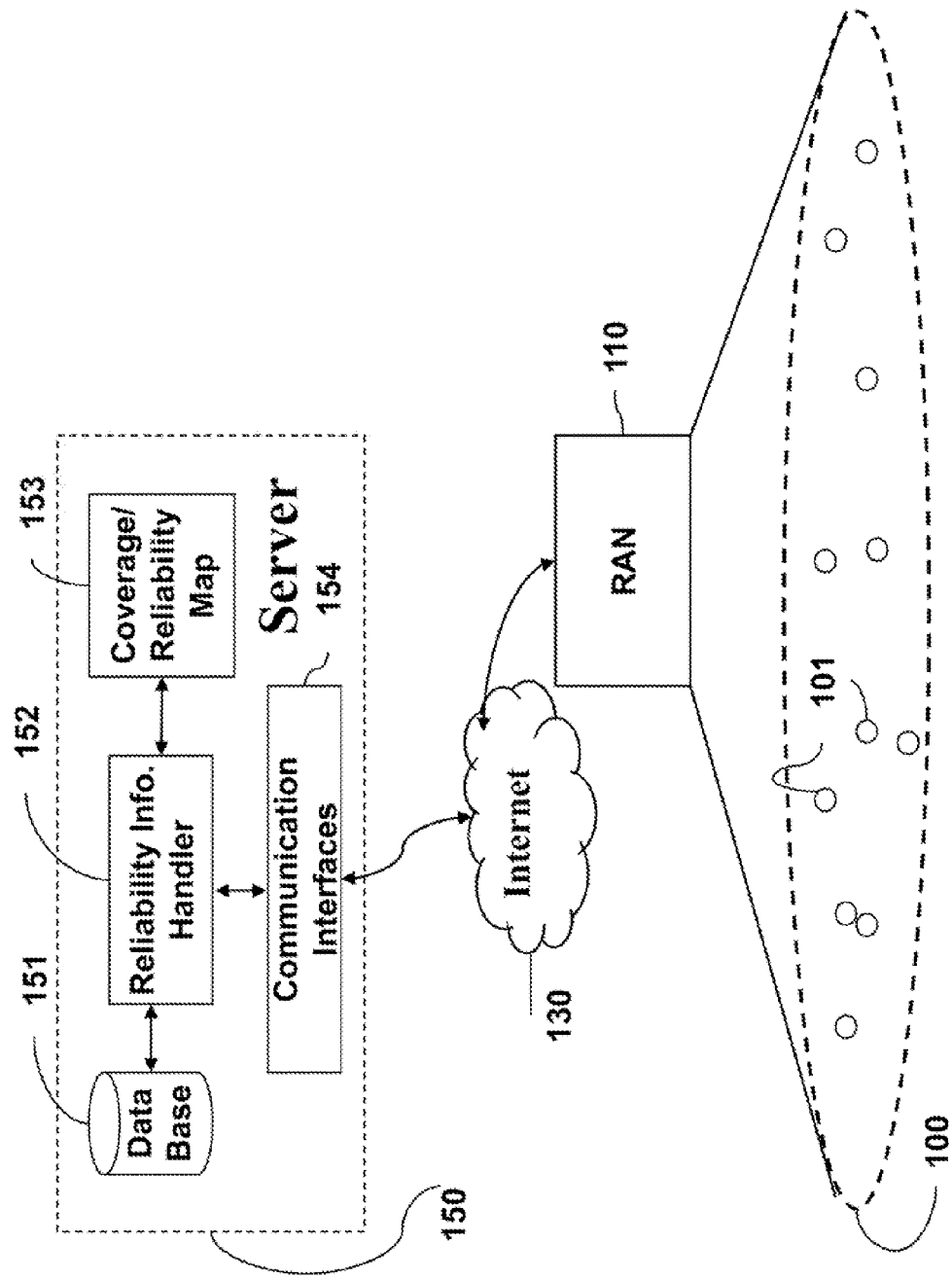
FIG. 1A is a schematic of a location based services (LBS) for data delivery according to embodiments of the invention.

FIG. 1A shows a location base services (LBS) for data delivery system according to embodiments of the invention. A server 150 delivers data to mobile devices (nodes) 101 in vehicles. The vehicles can have an on-board integrated node, or the nodes can be carried by any of the vehicle occupants. The nodes are located in a coverage area 100 of a radio access network (RAN) 110. A link capacity is dependent on an access network technology, e.g., LTE, WiMAX, WiFi, etc.

Coverage Map

A coverage and reliability map (MAP) 153 is assumed to be known perfectly. The server determines a delivery time for each node and the packets are delivered via the Internet 130 and the RAN, 110, to each node based on information stored in a database 151, to achieve efficient location based services (LBS) for data delivery.

Application functions are performed on the server 150. Telematics integrates telecommunications and informatics. The server collects information from vehicles within the coverage area 100, including e.g., current location, desired destination, recent drive times and road conditions.

In addition, the telematics server provides information to vehicles in the form of navigation updates and location based services, such as points of interest messages. The telematics server includes a database 151, a reliability information handler 152, a coverage map 153, and various communication interfaces 154. The database contains information pertaining to points of interest and the location of the nodes 101.

The reliability information handler 152 manages the tasks of transmitting route update Information and other messages to the vehicles, as well as receiving location updates, telematic data, and service requests from the vehicles.

A key feature of the telematics server is the use of the coverage map 153, which provides a map of link quality tor the area covered by the RAN. The reliability information handler uses the MAP to perform tasks, such as scheduling packet transmission to the vehicles based on their location and the corresponding link quality stored in the coverage map at that location. The details of several scheduling methods are described below.

The steps of the methods are performed in a processor at the server, including memory and input/output interfaces as described above, and known in the art.

Location Based Data Delivery Scheduler

Our invention provides four embodiments of location base data delivery scheduler considering peak traffic constraint and link reliability tor the data server in infrastructure-to-vehicle networks.

These four embodiments of the scheduler methods include: First come first serve (FCFS) with peak constraint; FCFS with link reliability; FCFS with peak constraint and link reliability; and FCFS with peak constraint and partial link reliability.

In general, the scheduler in the telematics server minimizes the total traffic that is sent over the RAN, 110. As described above, the scheduler has access to the coverage map and knowledge of the location of each node in the service area, or has an estimate of the node location from previous driving histories, location updates, or navigation routes the node is following.

Thus, one approach to minimize the total traffic is to wait until the node is at a location wherein the coverage map indicates there is a high probability of reception. Then, the scheduler transmits any packets destined to that node. This approach, however, does not take into account the delay incurred by waiting for favorable channel conditions. We can also consider that information destined for each vehicle needs to be delivered in a timely fashion. Then, waiting for a favorable channel causes too much scheduling delay.

To minimize traffic and delay, we consider constraining the scheduling of packets according a total offered load, and an average excess delay. The total offered load is the total number of transmissions including the initial transmissions and retransmissions. The average excess delay is the time a packet waits when the packet is not scheduled for transmission at the instant at which the packet arrives at the telematics server.

Scheduling Time Slots

The scheduler uses time slots. During each time slot, the scheduler examines pending packets and determines whether to transmit the packet in the current time slot, or delay transmission to a subsequent slot. The time required to transmit the packet is short compared with a scheduling slot so that packet transmission time along with all necessary retransmissions occurs within a duration of a time slot. Scheduling is also based on packet priorities as described in detail below.

Reliability Map States

Figure 1B:
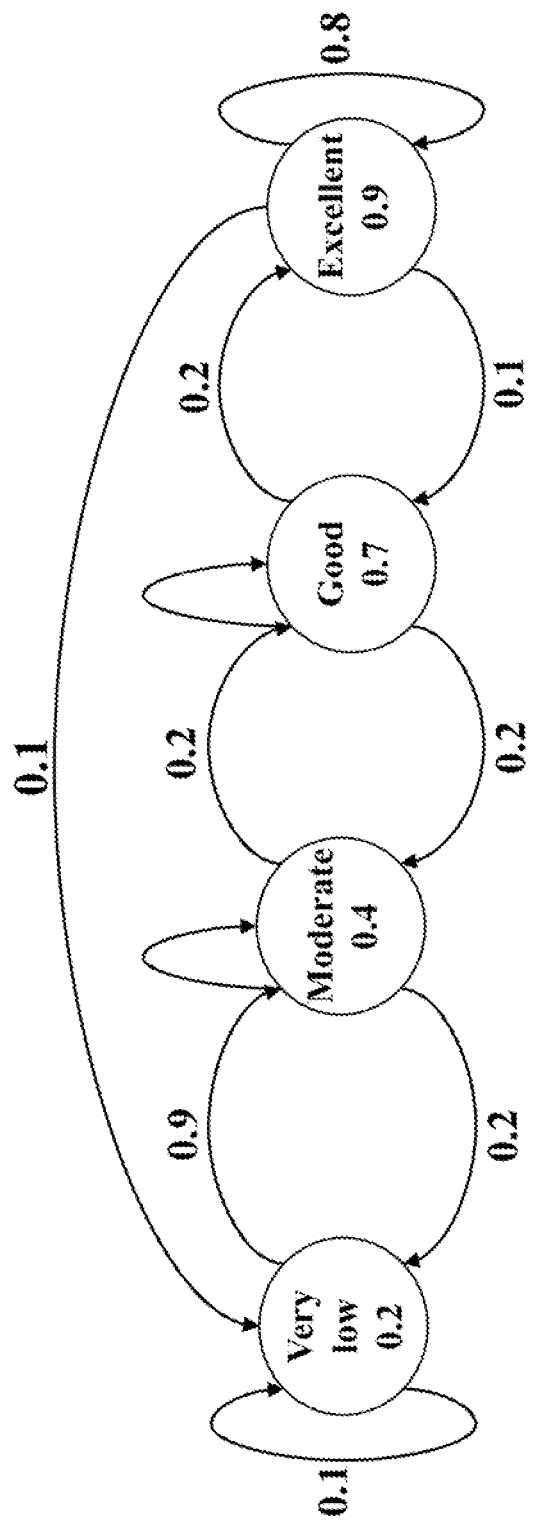
FIG. 1B is a diagram of a Markov chain with four link states according to embodiments of the invention.

FIG. 1B shows states and transitions between states of the node as represented as a Markov chain. The reliability map is quantized into four states, which are very low, moderate, good and excellent, with probability of successful transmission being 0.2, 0.4, 0.7 and 0.9, respectively. We note that FIG. 1B is an example of a particular model of the time varying evolution of the channel experienced by each node as the node traverses the coverage area. Our intent is to show how the various scheduling methods perform with time varying channels and link qualities. For our methods, the particular model used to generate realizations of link qualities is a secondary concern. The major assumption that needs to be fulfilled in order to implement our methods is the existence of a coverage map at the server that enables the telematics server to predict the link quality for each of the nodes at a particular location. This coverage map is accessible at the telematics server.

According to the Markov chain in FIG. 1B, a stationary distribution of link states (very low, moderate, good, excellent) is $\{0.1127, 0.3803, 0.2535, 0.2535\}$. We use one minute for the time slot, and an average excess delay means the average amount of time a packet waits for transmission, in terms of the time slot ignoring the packet length.

FCFS with Peak Constraint

Figure 2:
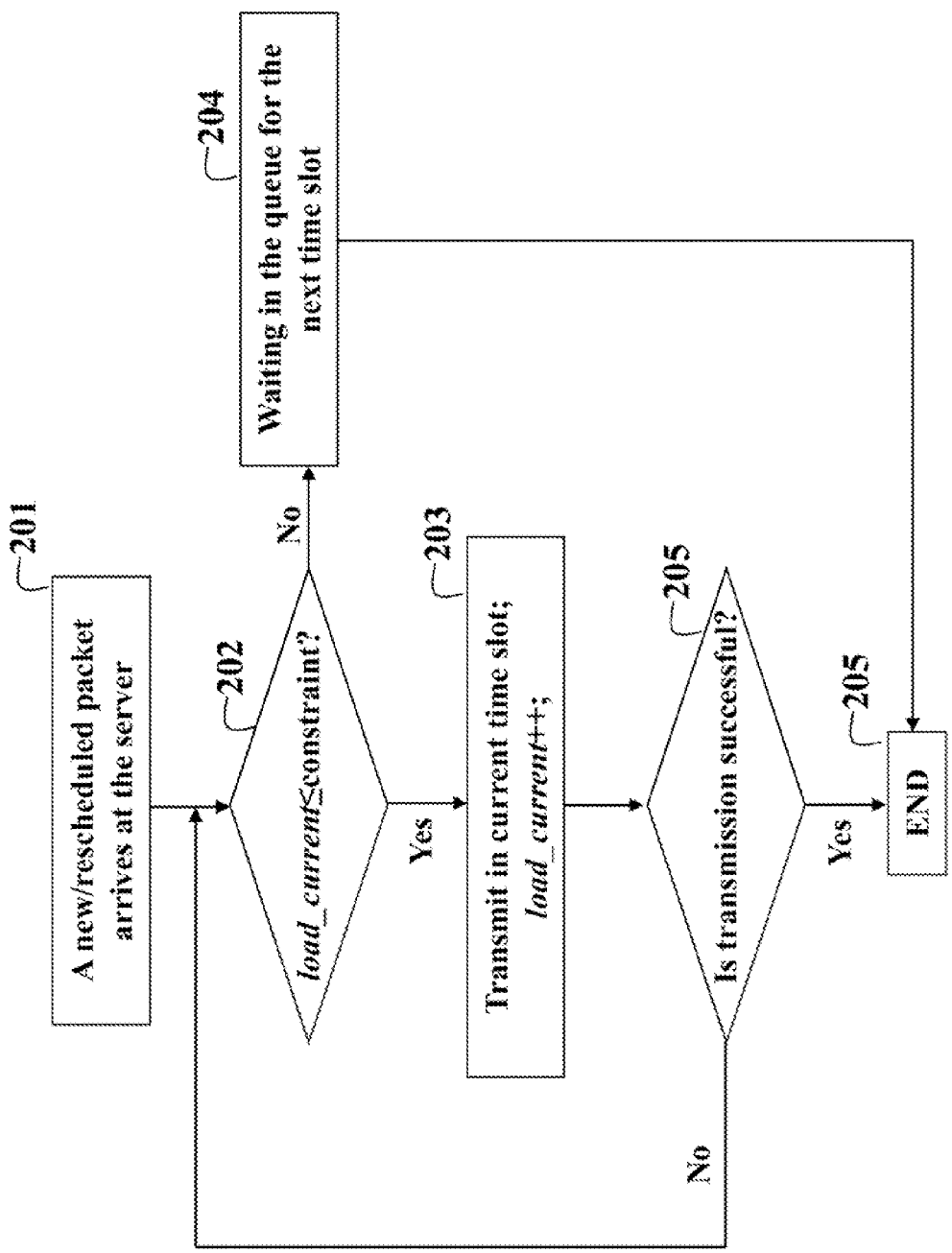
FIG. 2 is a block diagram of the scheduler FCFS (first come first serve) with peak constraint according to embodiments of the invention.

FIG. 2 shows the first embodiment of the scheduler FCFS with peak constraint. The scheduler sets a peak constraint and only transmits and retransmits the packet when the offered load in the current time slot has not exceeded the peak constraint.

A new or rescheduled packet arrives 201 at the server. The server makes a decision 202 by checking the offered load in current time slot, load_current, against a peak constraint.

If the value of load_current is less than the peak constraint, then this packet is scheduled to be transmitted 203 in the current time slot, and load_current increases by one.

If not, the packet is delayed by storing the packet in a queue 204, and waiting until a next scheduling time slot. After transmitting in current time slot, the server checks 205 the success of transmission for this packet.

If this transmission is successful, the procedure goes to END 206, and if not successful, the procedure goes to step 202 to make a decision for retransmitting or rescheduling.

The scheduling procedure described in FIG. 2 only considers the peak constraint, and does not make use of the coverage map in determining the scheduling slot. Thus, a packet destined for a node that is currently in a region with poor coverage can be retransmitted many times within the scheduling slot. This causes the packets destined to other devices to be unnecessarily delayed. That is, if the scheduler had selected to only deliver packets to devices in a good to excellent coverage area, then more packets could have been delivered. This case is considered next.

FCFS with Link Reliability

Figure 3:
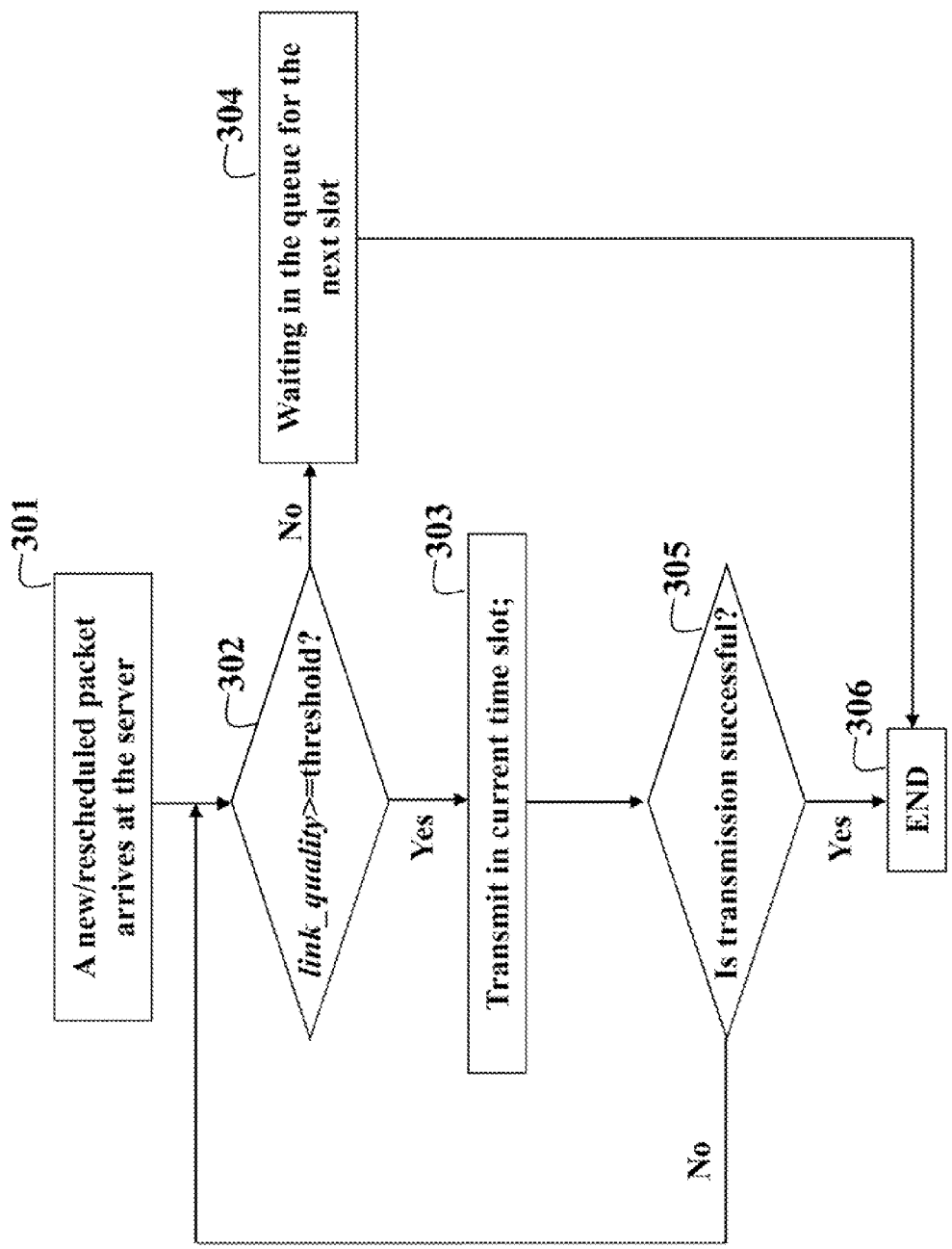
FIG. 3 is a block diagram of the scheduler FCFS with link reliability according to embodiments of the invention.

FIG. 3 shows the second scheduler FCFS with link reliability. This scheduler is designed to schedule the packets during the times of high link quality to reduce the retransmissions, resulting in reducing the total offered load.

A new or rescheduled packet arrives at the server 301. The server makes a decision by first checking 302 the link quality to the destination device in current time slot to insure that the value, link_quality, is above a given threshold of link reliability. If yes, this packet is scheduled to be transmitted 303 in current slot. If not, the pack waits 304 in the queue for the next slot. After transmitting in current slot, the server checks 305 the success of transmission for this packet. If this transmission is successful, the procedure goes to END 306, and if not successful, the procedure goes to step 302 to make a decision for retransmitting or rescheduling.

This process ensures that only nodes in areas where the link quality is above the scheduler's threshold are served. However, it does not guarantee any peak traffic constraint because the scheduler transmits all of the packets for which the devices have reasonably good link quality. We can combine the features of the two methods above to consider both peak traffic constraint and link quality.

FCFS with Peak Constraint and Link Reliability

Figure 4:
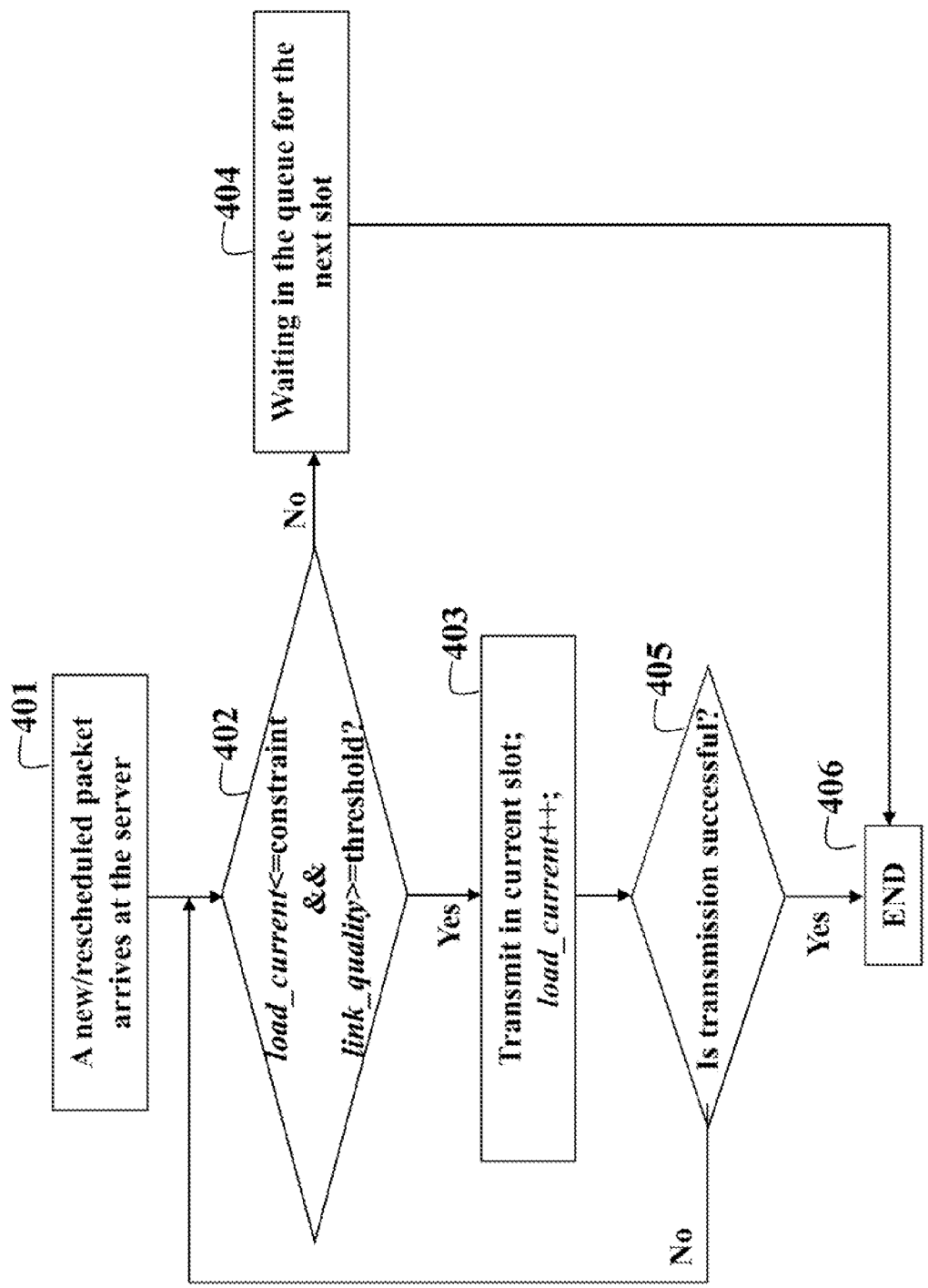
FIG. 4 is a block diagram of the scheduler FCFS with peak constraint and link reliability according to embodiments of the invention.

FIG. 4 shows the third scheduler FCFS with both peak constraint, and link reliability. This scheduler avoids exceeding a peak constraint and also uses the reliability map to schedule the transmissions during times of high link quality.

A new or rescheduled packet arrives 401 at the server. The server makes a decision by comparing 402 the offered load in current slot load_current with peak constraint and comparing the link quality in current slot link_quality with the reliability threshold 402. If yes, the packet is scheduled to be transmitted 404 in current slot and load_current increases by one. If no, the packet is delayed 404 until the next scheduling slot. After transmitting in current slot, the server checks 405 the success of transmission for this packet. If this transmission is successful, the procedure goes to END 406, and if the transmission fails, the procedure goes to step 402 to make a decision for retransmitting or rescheduling.

Thus, only packets that are destined for nodes in regions of high link quality are transmitted, as long as the total number of transmission attempts has not exceeded the peak constraint. This scheduling method reduces the offered load in the RAN because the number of retransmission is limited by the link quality threshold. In addition, the scheduler imposes a limit on the total number of transmission attempts by enforcing the peak constraint.

Due to the persistent checking of link quality at the scheduler, the delay incurred by some packets can be significant, because some nodes can be in regions of poor coverage. These nodes do not have any packets scheduled for delivery until they move into better coverage areas.

Thus, we can allow some relaxation of the link quality constraints to attempt the delivery of packets even when the link quality is known to be below the threshold. This has the effect of reducing the excess delay incurred by the scheduler at the expense of some increase in the offered load.

FCFS with Peak Constraint and Partial Link Reliability

Figure 5:
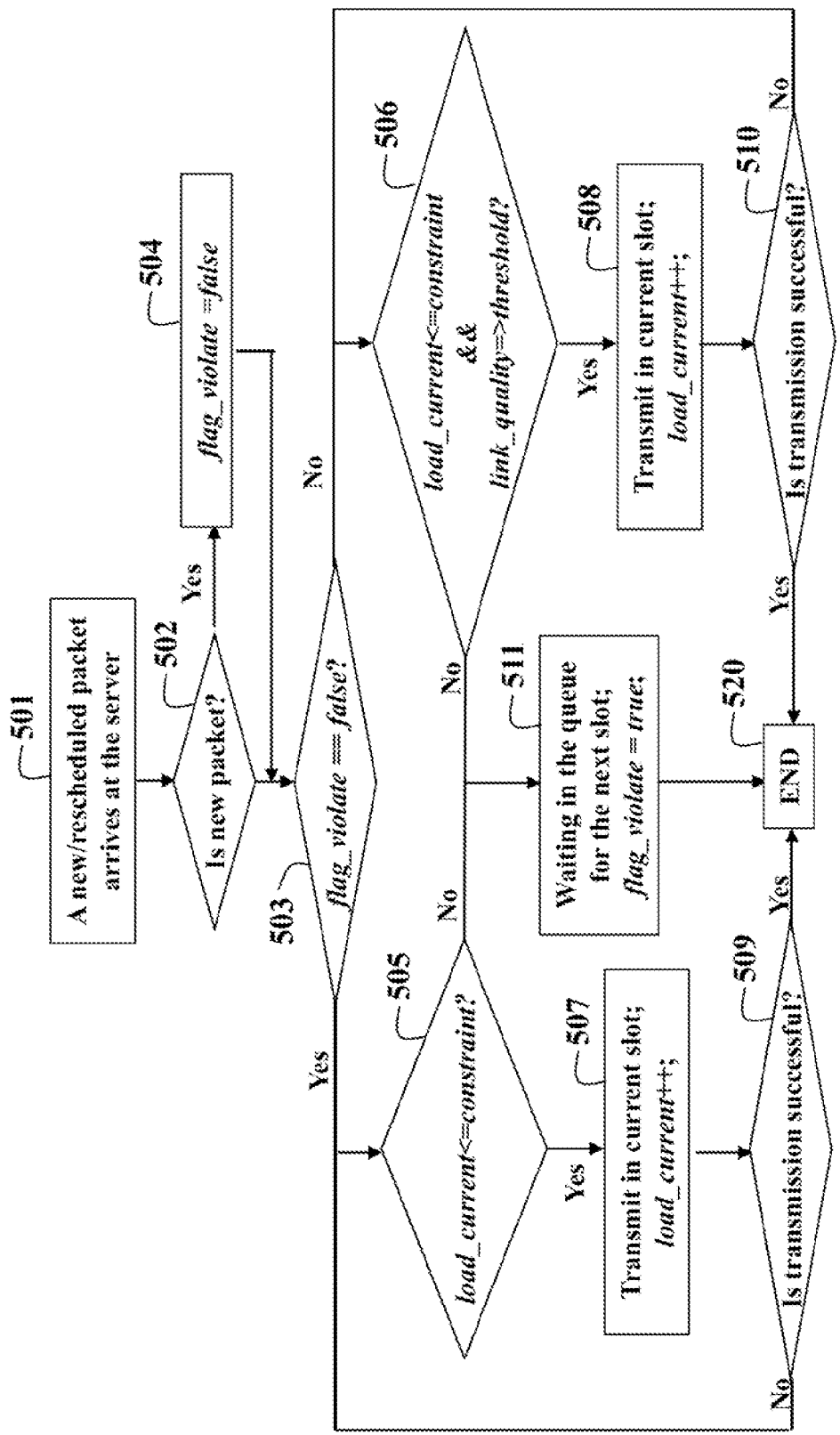
FIG. 5 is a block diagram of the scheduler FCFS with peak constraint and partial link reliability according to embodiments of the invention.

FIG. 5 shows the fourth scheduler FCFS with peak constraint and partial link reliability. This scheduler considers peak constraint for scheduling all the packets, and considers both peak constraint and reliability threshold only for those packets, which violate the peak constraint, in the following transmissions until success.

A new/rescheduled packet arrives 501 at the server. The server first checks 502 whether this packet is a newly arrived packet or a rescheduled packet. If it is a rescheduled packet the procedure directly goes to make a decision 503 by checking the value of the flag for violating the peak constraint for this particular packet flag_violate. If this packet is a newly arrived packet the server sets 504 flag_violate as false, and then to step 503. If the decision for step 503 is yes, then the server makes a decision by only checking 505 the offered load in current slot load_current with peak constrain. If the decision in step 503 is no, then the server makes a decision by checking 506 both load_current with peak constraint and link quality in current slot link_quality with the reliability threshold. After making a decision in steps 505 and 506, the following procedures are similar, and as described above. If the decision is yes, then the packet is scheduled to be transmitted 507 or 508 in current slot and load_current increases by one. If no, the packet is delayed 511 for the next slot, and the server sets flag_violate as true. After transmitting in current slot, the server checks 509 or 510 the success of transmission for this packet. If this transmission is successful, the procedure goes to END 520, and if not successful, the procedure goes back to respective steps 505 or 506 to make a decision for retransmitting or rescheduling.

In the following paragraphs, the four schedulers are referenced as (1), (2), (3), and (4) for simplicity.

The total offered loads of all four schedulers are near to that of FCFS with no scheduling when reliability threshold is 0.2 (state "very low").

The reliability threshold (>0.2) has apparent effects on reducing the total offered load taking advantage of transmitting if seeing high link quality. Scheduler (2) and Scheduler (3) are the best two schedulers when reliability threshold is 0.4, 0.7, and 0.9, while Scheduler (4) is medium, and Scheduler (1) is the worst, e.g. the best two are better than the latter two by 80% and 100%, approximately, when the packet arrival rate is 0.006 per minute, and reliability threshold is 0.7.

The average excess delay of Schedulers (1), (3) and (4) is near to each other when reliability threshold is 0.2 (state "very low"), while that of Scheduler (2) is the lowest due to the low reliability threshold has negligible effects on the delay compared to that caused by peak constraint. When the reliability threshold is 0.4, it is indicated that the delay of Schedulers (1) and (4) is lower than the other two if the traffic load is small, e.g. the packet arrival rate is below 0.003 packets/min. The performance of the scheduler (2) is stable and flat as the packet arrival rate increases. The delay by Schedulers (1), (4), and (3) is significantly increased as the traffic load is large, e.g. exceed the delay by the Scheduler (2) by 859.78%, 589.58%, and 285.1%, respectively, when packet arrival rate is 0.006. The performance of delay is similar for reliability threshold is 0.7 and 0.9, which indicates that the delay is not affected by the increase of threshold after the packets are only allowed during relatively "good" link quality or higher.

Scheduling Packets with Priorities

When packets are transmitted to the nodes, the packets can be prioritized according to importance. Some packets may require more rapid delivery or guaranteed delivery within certain time constraints. Packets arriving at the server are labeled according to their priority. This embodiment describes how the scheduling of priority packets is accomplished using both the priority information, as well as the MAP 153.

Figure 6:
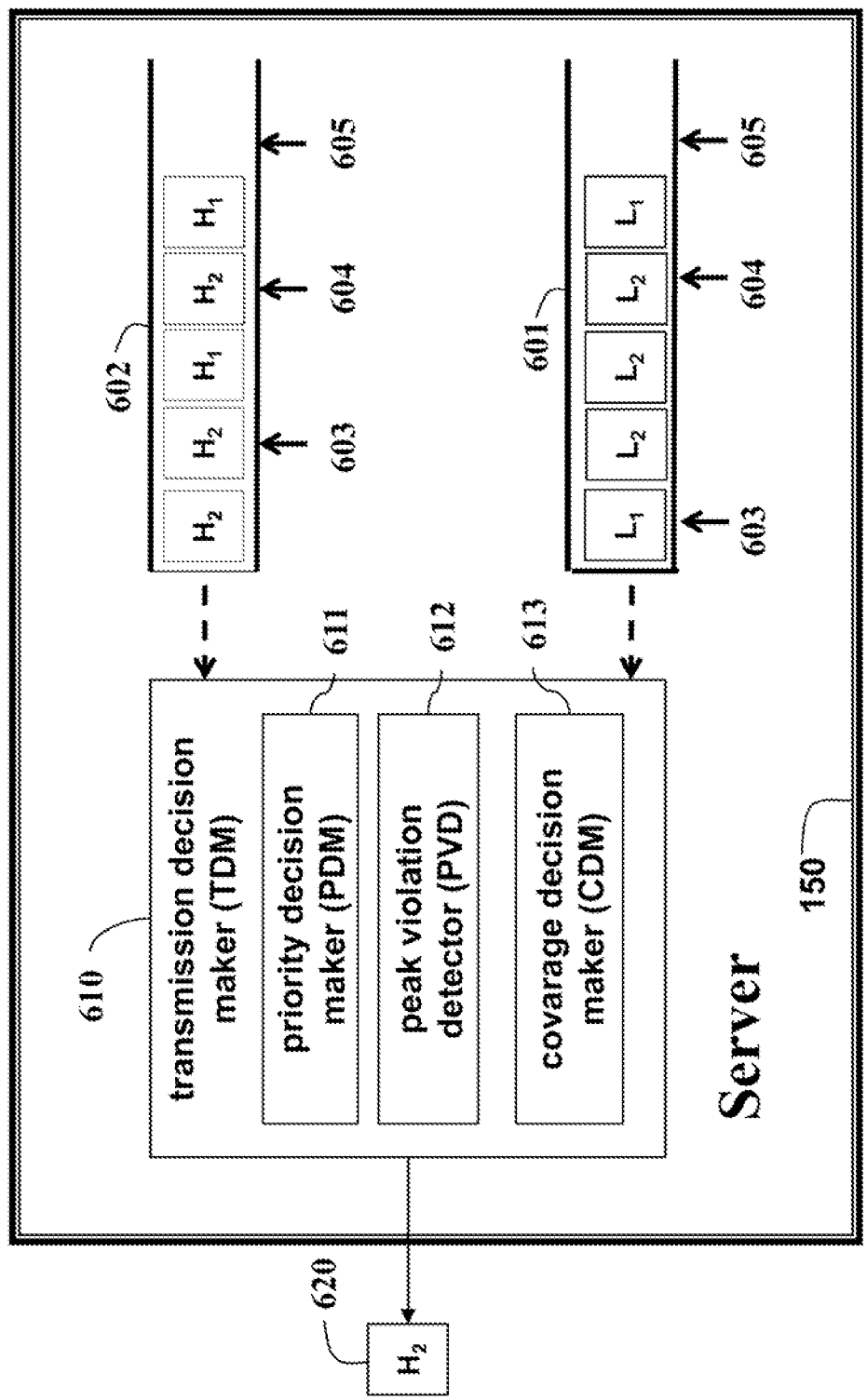
FIG. 6 is a schematic of scheduler blocks when network traffic with multiple priorities are scheduled according to embodiments of the invention.
Figure 7:
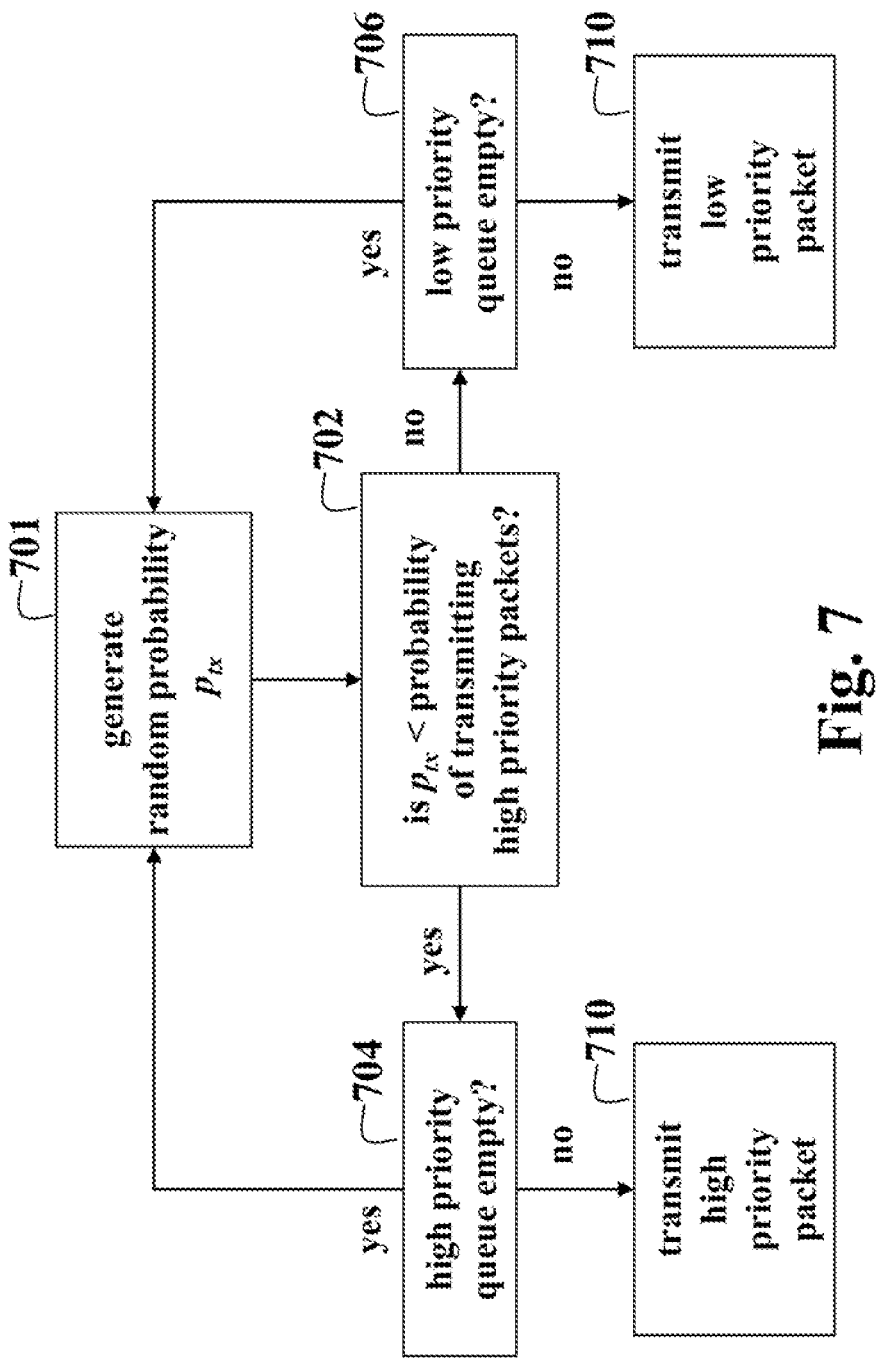
FIG. 7 is a block diagram of a scheduling procedure for multiple priority traffic and scheduling decisions based on coverage map data according to embodiments of the invention.

The prioritization is shown schematically in FIG. 6, and procedurally in FIG. 7. For example, we use low (L) and high (H) priority packets stored in corresponding queues 601 and 602. Destination nodes 1 and 2 are indicated by the subscripts. It is understood that additional priorities, queues and nodes can be used.

We use three indices for each queue, e.g., (high/low) Last 603, (high/low) Waiting 604, and (high/low) Tail 605. Last, indexes to the last packet successfully received stored by the vehicle. Wait indexes the next packet waiting for transmission. Tail indexes an end of the queue. The indices are updated periodically, and the scheduler uses the indices to make the decision of transmitting packets in scheduling slots.

The transmission decision maker (TDM) 610 includes a priority decision maker (PDM) 611, a peak violation detector (PVD) 612, and a coverage decision maker (CDM) 613. The TDM and the queues are located at the server 150.

High and low probabilities $P_h$ and $P_l$ are defined by the user determine when high and low priority packets are to be transmitted, where $P_h+P_l=1$. A random probability for transmitting $p_{tx}$ ($0<p_{tx}<1$) is generated 701 by the PDM, and compared 702 with parameters $P_h$ and $P_l$ to determine which priority queue is served. For example, the scheduler attempts to transmit 710 a high priority packet when $p_{tx}<P_h$. Otherwise, a low priority packet is transmitted 720, unless the high priority queue is determine to empty 704, or the low priority queue is determined to be empty 706.

The PVD works differently fir packets of different priorities. A peak constraint PC is assigned by the user. A high peak constraint $PC_h=PC$. A low peak constraint $PC_l=c_{res}\times PC$ when the high priority queue is not empty, and otherwise $PC_lPC$, where $c_{res}$ ($0<C_{res}<1$) is a coefficient representing a fraction of PC that is reserved for high priority packets.

After a packet is selected by the PDM, the PVD uses $PC_h$ or $PC_l$ to determine whether the current load has reached the peak constraint or not. The purpose of using the peak constraint reservation is to a give higher transmission probability to high priority packets. If the peak constraint is violated, then the current transmission is delayed until a subsequent scheduling slot. Otherwise, the process goes to the CDM.

The CDM uses the coverage map to determine whether an average link quality to the destination node is greater than a threshold of link reliability. If the average link quality is greater than the threshold, the packet is transmitted. Otherwise, the CDM searches the packets beginning from high Waiting+1 (or low Waiting+1) to high Tail−1 (or low Tail−1) to find a packet that is destined to a node located in an area of coverage that is at least good, see FIG. 1B, by checking the coverage map.

After the CDM determines a packet destined to a node in a good coverage area, the CDM swaps this packet and the packet indexed to by high Waiting or low Waiting, and selects the swapped packet for transmission. If no packet can be found, then CDM delays the transmission until a subsequent scheduling slot.

FIG. 7 shows the logic to select the queue from which a packet will be transmitted. After the queue is selected, the scheduler selects the next packet that is awaiting transmission.

This packet is indexed by either high Waiting+1 or low Waiting+1. The destination of the packet is examined and the scheduler uses its coverage map to determine the link quality at the destination node. The link quality along with the peak constraint, $PC_h$ for high priority packets and $PC_l$ for low priority packets are used to determine if the selected packet is transmitted in the current slot.

It should be noted that the above description is for the example case of two priority packets. However, generalizations to more than two priorities are straight forward and follow the same basic procedures as above.

Effect of the Invention

There exist tradeoffs between achieving small total offered load and small average excess delay. The choice for type of scheduler and reliability threshold at the server depends on the tolerance for offered load and excess delay by specific applications. These choices can be made dynamically during the operation of the network, depending on the factors described herein.

The embodiments of the invention prove the schedulers to minimize resources (bandwidth) on the wireless channels, resulting in reducing the cost for application providers, while satisfying the requirements for users of the nodes at the same time.

Four embodiments can dynamically be selected depending on various factors during operation of the network, such as link quality, load, reliability and the like.

These four embodiments include first come first serve (FCFS) with peak constraint, FCFS with link reliability, FCFS with peak constraint and link reliability, and FCFS with peak constraint and partial link reliability.

In one embodiment, a priority is associated with each packet, and the packets are stored at the sewer in priority queues, and packets are transmitted according to peak load constraint and the priorities.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for scheduling packets to be transmitted by a server to nodes in a coverage area of a wireless network, wherein the nodes are mobile devices, comprising the steps of:
    associating a priority with each packet;
    storing, at the server, each packet in a queue associated with the priority
    determining, at the server, whether a current load of the packets to be transmitted in a current time slot is less than a peak load constraint as determined from a coverage and reliability map (MAP); and
    transmitting, by the server, each packet based on the peak load constraint and the priority; and wherein priorities include high and low, and further comprising: generating a random probability;
    selecting a high priority packet for transmission when the priority is of the packet is greater than the random probability, and otherwise selecting a low priority packet, unless queues are empty; and
    wherein the peak constraint includes a high peak constraint and a low peak constraint such that a fraction of the peak constrained is reserved for high priority packets.

2. The method of claim 1, wherein each queue has three indices for a last packet, a waiting packet and an end of the queue, respectively.

3. The method of claim 1, wherein the server comprises a transmission decision maker (TDM), and the TDM comprises a priority decision maker (PDM), a peak violation detector (PVD), and a coverage decision maker (CDM).

4. The method of claim 3, wherein the CDM uses the MAP to determine reliabilities of links from the server to the nodes, and only transmits the packets if a reliability of a link to the node is greater than a threshold.

* * * * *